US005488700A

United States Patent [19]
Glassner

[11] Patent Number: 5,488,700
[45] Date of Patent: Jan. 30, 1996

[54] IMAGE RENDERING SYSTEM WITH LOCAL, ADAPTIVE ESTIMATION OF INCIDENT DIFFUSE ENERGY

[75] Inventor: Andrew Glassner, Palo Alto, Calif.

[73] Assignee: Xerox Corporation, Stamford, Conn.

[21] Appl. No.: 100,087

[22] Filed: Jul. 30, 1993

[51] Int. Cl.$^6$ ..................................................... G06T 15/50
[52] U.S. Cl. ............................................ 395/126; 395/131
[58] Field of Search .................................... 395/127, 129, 395/131, 121, 123, 126

[56] References Cited

U.S. PATENT DOCUMENTS

| 4,865,423 | 9/1989 | Doi ........................................... 364/514 |
| 4,928,250 | 5/1990 | Greenberg et al. ...................... 395/126 |

OTHER PUBLICATIONS

Ward, Gregory, J., et al., "A Ray Tracing Solution for Diffuse Interreflection", *Computer Graphics*, vol. 22, No. 4, pp. 85–92, Aug. 1988.
Burger, Peter, et al., "Illumination and Colour Models for Solid Objects" *Interactive Computer Graphics*, Chpt. 7, pp. 301–307, 1990.

Primary Examiner—Mark K. Zimmerman
Assistant Examiner—Michael Smith
Attorney, Agent, or Firm—Townsend and Townsend and Crew; Philip H. Albert

[57] ABSTRACT

A method for coloring pixels of a pixelated display to present a simulated image of a view of objects illuminated by light from light sources and light reflected off the objects is used in an apparatus for coloring pixels to create an image. According to the method, a space is defined, along with objects and light sources in the space. A view point is taken and a view surface is divided into unit areas corresponding to pixels in the image. As the illumination of points on surfaces of objects in the space is found, a data structure is saved for that point indicating its location, its orientation, and the rays of illumination which reach the point, each ray described by a direction, source, color, propagator object, and propagator type. Rays from those propagator types which identify diffuse reflections off significantly diffuse objects are saved as nearby diffuse estimators, and are used for finding the illumination at a nearby shading point without searching the entire space above the shading point for diffuse reflections.

12 Claims, 9 Drawing Sheets

IMAGE RENDERING SYSTEM WITH LOCAL, ADAPTIVE ESTIMATION OF INCIDENT DIFFUSE ENERGY

BACKGROUND OF THE INVENTION

The present invention relates to the field of image rendering. More specifically, in one embodiment the invention provides an improved system for rendering images which takes into account multiple diffuse reflections of light.

The process of deriving an image from a model is called "rendering" the image. The model is typically a geometrical description of a viewpoint, objects, and light sources, and their positions and orientations in a three dimensional space, often referred to as the model space, or "world". Locations in the model space are described by world coordinates, which is contrasted with image coordinates which describe a position in a view of the model space.

One well-known method of rendering an image is the process of "ray-tracing". Ray-tracing is illustrated in FIG. 1, which shows a three dimensional geometric model space 10 containing an object 12 with a surface 14, an object 16 with a surface 18, a light source 20, a view surface 22, and a center of projection, or "view" point, P. View surface 22 is divided into unit areas which have a one-to-one correspondence with pixels of a pixelated display device 24, and the pixels of device 24 collectively form an image of the model space. The image is a view of the model space when looking through view surface 22 from the perspective of view point P.

View surface 22 and the display surface of display 24, for simplicity, are shown as planar surfaces, however they need not be planar. View surface 22 also does not necessarily have to be the same shape as the display surface of display device 24 nor need viewing point P be a constant for all rays passing through view surface 22. Pixelated display device 24 could be a computer graphics monitor, a bit-mappable printer, or a device which stores bit-mapped images for later display.

The goal of ray-tracing, or any rendering process, is to determine color information each pixel in the image, such as exemplary pixel $A_{ij}$ of an image formed on display device 24 from the collection of pixels displayed on device 24. The color of pixel $A_{ij}$ depends on what objects and light sources (often referred to just as "objects", with light sources being self-luminous objects, or luminaires) are present in the model space and where they are located in that model space. More particularly, ray tracing determines the color of pixel $A_{ij}$ by tracing one or more rays, such as ray R', from point P through unit area $a_{ij}$ on view surface 22 and continuing until an object is encountered. The ray tracer then determines what color of light is given off the intersected object in the direction opposite the ray being traced (shown by ray R). Of course, ray tracing is iterative, in that rays must be sent out from the intersected point to see what light illuminates the intersected point, in order to determine what light is reflected or transmitted in the direction of ray R.

Depending on the implementation, multiple rays R' might be sent out for each unit area, and the resulting color for the multiple rays are combined (by averaging or other means) to arrive at a single color value for the unit area, and thus for the pixel. Aliasing causes edges to appear jagged, or "stair-stepped". Using multiple rays per pixel reduces aliasing, by providing "smoothed" colors in adjacent pixels.

Color can be represented in a number of ways, but is generally reducible to an n-tuple of component color values. The n-tuple of values might be an RGB representation (triplet of red, green, and blue intensities), or CYMK (quartet of cyan, yellow, magenta, and black intensities), or even a 20- or n-tuple of intensities of specific wavelengths covering the visible light spectrum. In rendering processes, color can be treated as an n-tuple or each color component could be processed as a separate monochromatic image.

Color, when used below, refers to the intensity as well as shade, so a specific color could refer to the intensity of lightness or darkness in a monochromatic image, such as a black ink intensity on a printed page, or it could refer to different shades of similar intensity, such as the color red and the color blue-green. Although colors viewed by the human eye might be suitably represented by intensity values of three components, more color components are often needed to accurately model physical effects such as reflections from a surface where the specular energy reflected from the surface is a function of wavelength. The units of color are generally the power per normalized unit of area at the point the light is being measured.

The following discussion will assume that ray R' does intersect an object. This assumption is not limiting, since a "background" object can be provided if needed, to catch all rays which would not otherwise intersect an object. The background object is behind (relative to the view) all the other objects in the model space and occupies the entire view of view surface 22 which is not occupied by other objects in model 10. If the model space has a background at infinity, then a finite background object which gives off no light should be used.

In FIG. 1, the first surface encountered by ray R' is surface 18 of object 16, at the intersection point O. Because the first intersection of ray R' is surface 18 at point O, the color value for pixel $A_{ij}$ is simply the color of light given off (emitted, reflected, or transmitted) by object 16 at point O along ray R. The light given off by object 16, which is non-self-luminous, is just the light reflected from object 16 at point O and the light transmitted through object 16 at point O. Since reflection and transmission (through the bottom of a fully or partially translucent surface) are handled in nearly identical ways, the discussion herein is in terms of reflection, with the understanding that transmissive effects are also included.

Although ray R' is shown as a line, it is actually a pyramid with an apex at point P and sides defined by the sides of the unit area $a_{ij}$ (or a portion of the unit area when multiple rays per pixel are traced). However, for small enough unit areas, the pyramid is suitably approximated by a ray through the center of the unit area, or multiple rays distributed over the unit area. Pixel $A_{ij}$, which by definition can only have one color value, then has the color value of the light reflected by point O in the direction of ray R, or a suitable combination of the multiple rays passing through $A_{ij}$.

Thus, the problem of ray tracing is reduced to finding the color of light reflected off the point O along ray R. The color of light reflected off a point is dependent on the light incident on that point. Because of the iterative nature of shading a point (finding its color), shading points on objects intersected by tracing rays occupies most of the computing power required for rendering an image.

Light reflected by point O is well approximated by a linear combination of a specular reflection and a diffuse reflection, with self-illumination ignored for now. Specular reflection off a point is light directionally reflected in a direction opposite the light incident on the point, i.e., a mirror-type reflection. The light being reflected strikes the surface at a point with a given angle with respect to a normal to that surface at the point, and the reflected light leaves the surface in a direction of a ray which is in the plane defined by the normal and the incident ray, although the reflected ray might be dispersed somewhat. This dispersal can be modelled by the "Phong" illumination model, which approximates the intensity of the specularly reflected light at any angle as a function of the difference between that angle and the angle of the reflected ray (call this quantity θ) and which is proportional to $\cos^n\theta$, where n, the specular reflection exponent, is a characteristic of the surface which reflects the light. For higher values of n, the specular qualities of the surface approach a perfect mirror, where a single incident ray results in a single reflective ray. For lower values of n, the surface approaches a diffuse surface.

There is another kind of specular light, refractive light. Refractive light is light which arrives at point O from below surface 18, such as when object 16 is translucent an illuminated from behind. This light is treated as specular light, except that the refractive index of the surface and light sources or lit objects below the surface of the object must be taken into account. This is also known as transmissive reflection. The extension of these concepts to refractive light is straightforward, so refracted light will be ignored for now.

The other type of reflected light, diffuse reflected light, is reflected in all directions evenly, i.e. the intensity in any given direction is not a function of the outgoing direction, only a function of surface properties and the direction and color of the incident light. Objects which do not appear shiny reflect primarily diffuse reflections, whereas shiny objects have more specular reflection. Most real objects have some of both.

As hinted at above, reflected light depends not only on the light incident on the surface, but also depends on what the surface does to the light it is given. The surface converts incident light into specular reflected light, diffusely reflected light, and absorbed light. The absorption of a surface is easily modelled, and as a first approximation, the object's color indicates its absorption. The amounts of a given light which will be specularly reflected and diffusely reflected are also easily modelled.

Thus, from surface characteristics of a point on the surface of an object and the descriptions of all incident light rays on that point, the reflected light from the point can be calculated. To find the reflected light along a specific ray from a point on a surface, such as ray R leaving point O, one needs to know only the light incident on point O from one direction (the specular component), the light incident on point O from all directions (diffuse components), and the surface characteristics at point O. Thus, since diffuse reflections are omnidirectional, a diffusely reflected ray of light which could reflect in the direction of a traced ray could come from anywhere. To find specular reflections in the direction of the traced ray, one only needs to look in one direction (or a small number of directions for dispersed specular reflections), namely the direction of reflection.

FIG. 2 illustrates this point, showing surface 18 of object 16 in greater detail. The light given off of surface 18 in the direction of ray R is the light of interest, and N is a vector normal to surface 18 at point O. The light of interest for calculating the specular reflection in the direction of ray R is found by measuring the light incident on point O from the direction of ray S and factoring in the specular reflection characteristics of the surface (S' is the refractive component) at point O. The light of interest for calculating the diffuse reflections in the direction of ray R is another matter, since the region above the surface 18 must be searched for objects in all directions. Only some of these directions are illustrated by the rays D in FIG. 2. The computation becomes intractable when multiple reflections are considered—to find the color of light arriving at point O from a point on another object, such as point Q on object 12, all the rays of light arriving at point Q must be determined to find the color of light given off by object 12 at point Q in the direction of point O.

The problem of the infinite directions of rays D is simplified somewhat if the point O is visible by only a few points on illuminating objects, but most realistic looking images are complex enough that a means for dealing with the large number of light sources diffusely reflected by a point on a surface is needed. Several solutions to the problem of diffuse reflections have been proposed, but none are entirely satisfactory.

One solution is called the "radiosity" method. With radiosity, every object is divided into finite elements, and starting with the proposition that all light in a closed system is conserved, the light coupling between each finite element and each other finite element is calculated. Then, to calculate the image, the light sources illuminate all the finite elements in their field in a first pass, and then the light is coupled to other finite elements in subsequent passes, with some arbitrary limit on the number of iterations. After the radiosity of each finite element is calculated, a view point (center of projection) and a view plane are placed in the modelling space, and rays from the view point through the unit areas of the view plane are intersected with finite elements. The radiosity of an intersected finite element indicates the color of the pixel associated with that unit area.

The problem with radiosity methods is that the division of object surfaces into finite elements is an art. If the finite elements are too small, computation time is wasted, and if the finite elements are too large, the final image might appear with jagged edges (aliasing). Even with the proper division of surfaces into finite elements, computation time might be wasted calculating radiosity parameters for points of surfaces which are not visible in the desired view plane from the desired view point.

Another proposed solution is to ignore the effect of diffuse reflections from points such as point Q when determining the light incident on point O. This simplifies the calculations in many cases, since most points will appear black to point O, and only the light sources and rays of specular reflection directed at point O need to be considered. Of course, in a model space containing light sources and two objects with diffuse surfaces, no light from one object would reflect off the other. FIG. 3 illustrates the error caused by this simplification.

FIG. 3 is a model space 48, which has a light source 50 directly illuminating a wall 52 and an enclosure 54, each of which are not translucent and have diffusely reflecting surfaces facing light source 50. Wall 52 blocks light source 54 from direct view at a view point V. Another wall 56 is located behind enclosure 54 with respect to view point V and also has a diffuse surface which faces enclosure 54 and view point V. Suppose light source 50 outputs white light, the surface of enclosure 54 visible from light source 50 is black, the surface of wall 52 visible from light source 50 is red, and the surface of wall 56 facing enclosure 54 and view point V is white. In such a model, light from light source 50 will reach view point V only through two (or more) diffuse reflections along a path such as paths P, and the light reaching view point V is red. Given the geometry of model 48, specular reflections off wall 52 and then off wall 56 cannot reach view point V.

In the above example, a rendered image of model 48 will appear completely black if multiple diffuse reflections are ignored. A correct rendering is one in which the visible portion of wall 56 (area 58) is shaded with various intensities of red, the red light being brightest near the edge of wall 52.

One method of accounting for the elimination of multiple diffuse reflections in a rendering is to add in an "ambient" light source. The model for ambient light is a constant color light striking an object from an unspecified angle and diffusely reflecting from that object. Ambient light, however, does not account for the interplay of light off various objects in a model and the subtle shadings in shadows. In the example of FIG. 3, the ambient light would not necessarily be red, so area 58 would appear to be whatever color is chosen for the ambient light. Furthermore, the side of wall 52 visible from view point V would be lit by the ambient light, when wall 52 is totally dark in a correct rendering.

Ward [Ward, G. J., "A Ray Tracing Solution for Diffuse Interreflection", *Computer Graphics,* Vol. 22, No. 4, August 1988, pp. 85–92] presents a method of averaging indirect illumination (light from non-self-luminous surfaces) incident on a surface. At the start of a rendering, the indirect illumination at a point is calculated, used in the ray tracing process and then stored. When calculating the illumination of a point nearby the first point, the indirect illumination values stored for the first point are used for the nearby point, if the nearby point is "close enough" to the first point.

As calculations are done for points, the points are given weights which indicate the span of the surface around the points over which their calculated indirect illumination values might be usable, and for some points, a weighted average of indirect illumination values of multiple nearby points is used. Thus, at the beginning of the rendering, most points are evaluated by the primary process in which indirect illumination is calculated for the point and stored, and later in the rendering, more points are evaluated using a secondary process in which stored values are averaged from values stored during the primary process for nearby points.

One of the drawbacks of such a system is with models having rapidly changing light sources, which allows fewer evaluations to be done using the secondary process. At the limit, indirect illumination values are calculated at every point using the primary process and none of these calculations are reused at other points in the secondary process.

Further efficiencies in computing diffuse reflection contributions are still needed. Ward suggests that after some number of reflections, the light be replaced with an ambient light term, to limit the number of calculations. While this may be an improvement over the prior method of treating all reflections beyond the first diffuse bounce as ambient light, an improved method and apparatus for quickly rendering an image of a geometrical model in a defined space is still needed.

SUMMARY OF THE INVENTION

An improved method and apparatus for rendering an image of a geometrical model in a defined space is provided by virtue of the present invention.

In one method according to the present invention, pixels of a pixelated display are colored based on models of light reflected from points of objects visible from a view point through a view surface divided into unit area for each pixel. The light reflected from a point is calculated from properties of the object whose surface includes the point and from the light incident on the point. The light incident on the point is either calculated by further ray tracing, with the results of the ray tracing stored, or is calculated from a weighted average of stored ray tracing results for nearby points. The light incident on a point is stored as ray information, indicating the direction and color/intensity of the light, as well as an indication of whether the source of the light is a specular reflector, a light source, or a diffuse reflector, however, in some cases, only the diffuse contributions are stored and the other contributions are calculated as needed. In some embodiments, the intersection points, where the ray intersects an object surface, are also stored. The incident light information also includes information indicating direction of the incident light. Direction is equivalent to a point on an illumination sphere centered on the illuminated point. Of course, on opaque surfaces, the illumination sphere is actually an illumination hemisphere, although anything that applies to an illumination hemisphere also applies equally to an illumination sphere.

To evaluate incident light at a given point from the stored illumination of nearby points (either an illumination hemisphere, or a nearby diffuse estimator, or NDE), the direct illumination can be found by ray tracing to the light sources (to ensure suitable shadows), the specular illumination is found by either ray tracing to the sources of the specular reflection, via a search in regions previously found to contain specular reflections, or by interpolating values from ray information stored in suitable NDE's, and the diffuse illumination is found by averaging values from suitable NDE's, or using the directional information from suitable NDE's to narrow the search for diffuse sources. Alternatively, some illumination may be found through the use of invisibility information. The suitability of an NDE is a user-settable parameter and is also a function of the geometry between the NDE's shading point and the shading point being evaluated.

In some embodiments, an NDE contains data indicating the location of the shading point for the NDE, as well as an indication of the orientation of a surface tangent plane (or alternately, the direction of a normal to the surface) at the shading point of the NDE. In some embodiments, an improved means for determining the light associated with each returned light sampling ray is provided. Each sampling ray returns not only a color value indicative of the light incident on a shading point, but also returns an indication of the object hit and other objects intersected by a continuation of the ray. This additional information, termed "invisibility information", is used to divide the surfaces of intersected objects into cells of finite areas around each intersected point. The points intersected by the continuation of the sampling rays are labelled "invisible" intersection points, since they are not visible from the shading point. The cells around the intersection points are determined by creating a Voronoi diagram over the surfaces of the objects intersected. The light returned for each sampling ray is then just the light from that ray's cell. The light from the cells surrounding invisibility points is not calculated, as those cells are just used to affect the proper boundaries of cells which are visible from the shading point. An invisible point is due to either being on the far side of an object (i.e., a self-shadowed surface) or by being a point on an object obscured by another object.

A further understanding of the nature and advantages of the inventions herein may be realized by reference to the remaining portions of the specification and the attached drawings.

DESCRIPTION OF THE PREFERRED EMBODIMENTS

Figure 4:
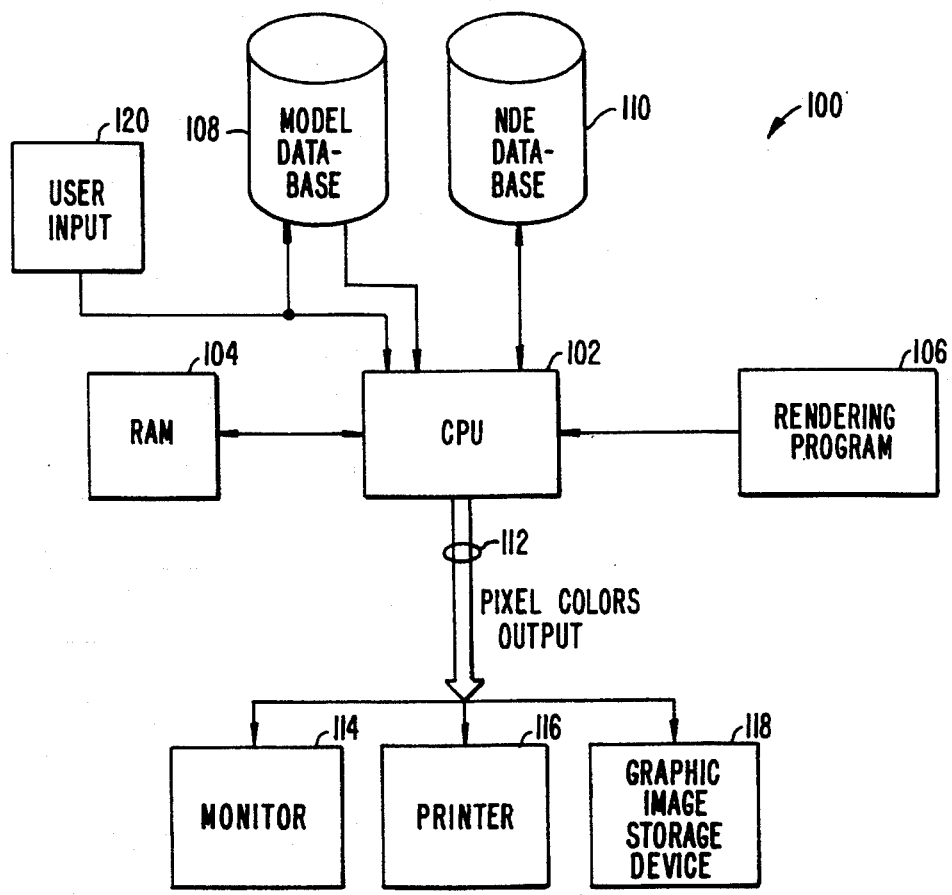
FIG. 4 is a block diagram of a digital computer for rendering images according to the present invention.
Figure 3:
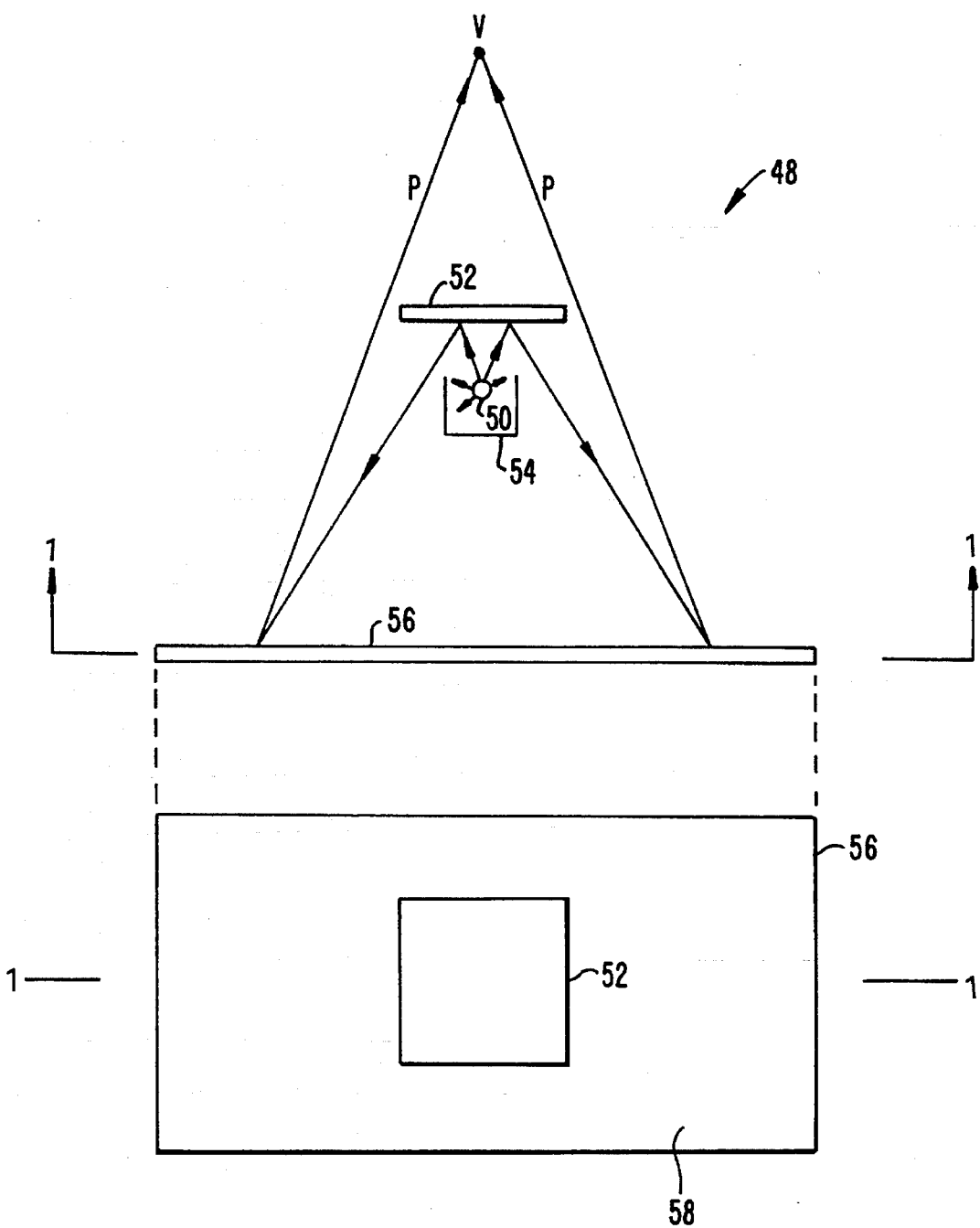
FIG. 3 is an illustration of several objects in a model space where diffuse light dominates a view.

FIG. 4 is an illustration of an apparatus which renders images according to the present invention. Digital computer 100 is shown comprising a central processing unit (CPU) 102, random access memory 104, a rendering program 106, a model database 108, a nearby diffuse estimator (NDE) database 110, and an image output bus 112 which outputs images in a form suitable to be displayed on a graphics monitor 114, printed by a bit-mappable printer 116, or stored in a bit-map graphics file format in a storage device 118. A means for user input 120 allows for user control of CPU 102, rendering program 106, and the entries of model database 108.

Rendering program 106 is read from disk storage media or from read-only memory (ROM) and is executed by CPU 102 in order to generate a bit-mapped image based on the elements of model database 108. An operation of rendering program 106 is described below, with reference to FIGS. 6(a)–(b).

Model database 108 contains entries describing elements in a model space, including elements such as a view point, a view surface, light sources, backgrounds, and light-reflecting or light-absorbing objects. Some of these objects are described by reference to geometric primitives using a three dimensional world coordinate system. For example, a view point is described by three values, the point's x, y, and z coordinates in the world coordinate system. Some objects are described by more complex functions, such as a toroid with a surface having a random texture. Some objects cannot be described by functions alone, such as an object whose surface is a painting digitized and wrapped over the object. The descriptions of these types of objects are stored in tabular, or bit-mapped, form.

In some embodiments, model database 108 does not include information on the location of the view point and the view surface. In those embodiments, the view information is provided by another database, or by user input 120 to digital computer 100. Model database 108 could be a conventional model database containing descriptions of objects in the model space stored in one or more files of a disk storage device.

Often, the model described by model database 108 is a geometrical approximation to a collection of physical objects for which an image is needed. This is useful, for example, for previewing a room in a house before it is built, or for showing the look of a room once furniture is installed. Thus, in most image rendering applications, the accurate reproduction of light interactions between light sources and objects is essential to create the visual impression that the image is in fact a physical image of an existing physical space in which the described objects are contained.

NDE database 110 contains data relating to the incident light at points on surfaces of objects located in the model space. As explained below, NDE database 110 is initially empty, but is populated by the actions of rendering program 106. The structure of data records in NDE database 110 is described below in connection with FIG. 5. CPU 102 clears NDE database 110 in an initialization step of rendering program 106 and adds records in an incident light determination step of rendering program 106.

In the process of rendering an image specified by the elements of model database 108, CPU 102 builds up a two dimensional array of pixel color values, which might be output to image output bus 112 as pixel color values are calculated, or might be cached in RAM 104 until all the color values for the image are calculated, after which they are output as a block onto image output bus 112. In some cases, the format of the image data output onto image output bus 112 is independent of the device which uses the image, however in other cases, the format of the output data is different for a given image output to different devices. For example, if monitor 114 is an RGB monitor and printer 116 is a CYMK printer, then the image might be output with color values in the RGB color space if it is output to monitor 114 but output with color values in the CYMK color space if it is output to printer 116.

Figure 5:
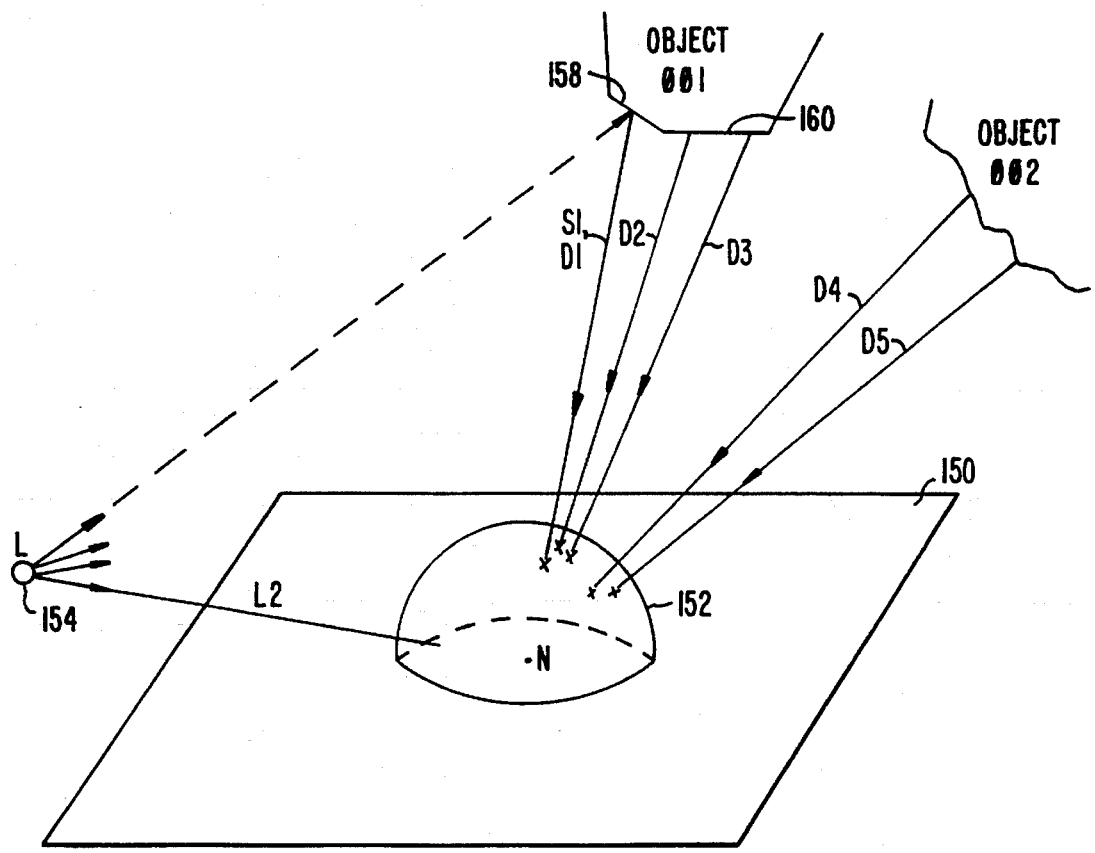
FIG. 5 is a representation of an illumination hemisphere, which might also be a nearby diffuse estimator (NDE) stored in the NDE database shown in FIG. 4.

FIG. 5 illustrates one representation of the light incident on a shading point, showing shading point N on a surface 150 illuminated by light from an object 001, an object 002, and a light source 154. The representation shown is an illumination hemisphere 152. The light striking shading point N will necessarily pass through hemisphere 152 (if surface 150 is translucent, a sphere is used instead of a hemisphere), therefore the incident light on shading point N can be found by sampling rays passing through hemisphere 152 and shading point N. The sample rays need not be evenly-spaced; in fact, with adaptive point-sampling, sample rays are denser in solid angles of particularly bright illumination and in solid angles which span large changes in illumination.

The sample rays sample light arriving at point N from propagator objects, which are either light sources or reflective objects. Each sample is characterized as a type I sample or a type II sample. Type I samples represent light which is from a diffuse reflection off a "significantly diffuse" surface of a propagator, and type II samples are those which are not classed into type I. A surface is significantly diffuse if the diffuse reflection off the surface is more than a predetermined threshold. This threshold is a measure of the irradiance (radiant flux per unit area) of the surface. Thus, a sample is treated as a diffuse sample if more light than the threshold arrives at the shading point as a diffuse reflection off the surface being sampled. Type II samples include direct illumination by a light source, illumination by a specular reflection, and illumination by a diffuse reflection from a surface which is not a significantly diffuse surface. It is possible for shading point N to be illuminated by more than one type of light from a given point on a propagator, in which case multiple samples would occur on hemisphere 152 with the same position. For example, rays S1 and D1 represent light from the same point on the surface of object 001. If an object is both reflective and translucent, the specular reflection and the direct light can be represented in separate type II samples or they can be combined into a single type II sample.

Each sample is shown in FIG. 5 by a ray. Ray L1 is direct illumination; ray S1 is a specular reflection, and rays D1–5 are diffuse reflections. Suppose that facet 158 of object 001 and the surface of object 002 are classified as being significantly diffuse surfaces, but that facet 160 is not. In that case, D1, D4, and D5 are type I rays and L1, S1, D2, and D3 are type II rays.

Each sample is described by the propagator of the ray (an object or a light source), the approach direction of the ray, the type of propagator, and the intensity of the light. Some embodiments include the intersection point of the ray and the propagator surface, in UV surface coordinates or XYZ world coordinates. The propagators shown in FIG. 5 are light source 154, object 001, and object 002. The approach direction of the ray indicates where the ray intersects the surface of hemisphere 152, and can be expressed as a polar angle and an azimuthal angle (or UV coordinates on the surface of the hemisphere). The type of propagator indicates whether the ray is a type I or type II ray. The intensity of the sample is expressed as the energy density of the light in that sample distributed over various components in a color space. For example, one color space is the visible spectrum sampled at n evenly-spaced wavelengths, and the value of one component of the intensity value is the energy of the sampled wavelength which is incident on a unit area normal to the ray and includes the shading point. Table 1 shows what an illumination data structure for hemisphere 152 might look like, assuming monochromatic light for simplicity.

In some embodiments, each ray record (i.e., a line in Table 1) includes a field (column) identifying the location of the intersection point on the propagator which produces the light for the ray (PROP_PNT). This information can be used to calculate the distance between the shading point and the intersection point, which is useful for approximating light attenuation due to intervening atmosphere, among other things.

If the location of the intersection point on the propagator is fully specified in world coordinates, the direction of the ray in polar coordinates does not necessarily need to be stored, as it can be calculated from the intersection point and shading point coordinates.

Since the light in any direction can be easily calculated from an illumination hemisphere for a shading point in the view, the bulk of the effort of the rendering process for that shading point is in generating the shading point's illumination hemisphere. Additional hemispheres are also needed on surfaces which reflect light towards a shading point, in order to determine the light arriving from those surfaces. Thus, much of the computational effort of rendering can be eliminated if the information in the illumination hemispheres can be reused. This reusable information is stored as nearby diffuse estimators (NDE), as described below.

An NDE is essentially an already-calculated illumination hemisphere saved in NDE database 110. Each NDE in NDE database 110 is associated with the shading point in the model space which was the shading point of the illumination hemisphere. An NDE comprises data elements for the shading point's location, the orientation of the surface at that point, and a plurality of data elements each describing a sample of light incident on the point such as the lines of Table 1. An NDE also contains an additional data element not necessarily found in the illumination data structure: a

TABLE 1

| | Illumination data structure for point N | | | | |
|---|---|---|---|---|---|
| RAY_ID | PROP_OBJ | PROP_PNT | PROP_TYPE | DIRECTION | INTENSITY |
| L1 | L154 | $(X,Y,Z)_{L1}$ | II | $(U_{L1}, V_{L1})$ | $E_{L1}$ |
| S1 | OB001 | $(X,Y,Z)_{S1}$ | II | $(U_{S1}, V_{S1})$ | $E_{S1}$ |
| D1 | OB001 | $(X,Y,Z)_{D1}$ | I | $(U_{D1}, V_{D1})$ | $E_{D1}$ |
| D2 | OB001 | $(X,Y,Z)_{D2}$ | II | $(U_{D2}, V_{D2})$ | $E_{D2}$ |
| D3 | OB001 | $(X,Y,Z)_{D3}$ | II | $(U_{D3}, V_{D3})$ | $E_{D3}$ |
| D4 | OB002 | $(X,Y,Z)_{D4}$ | I | $(U_{D4}, V_{D4})$ | $E_{D4}$ |
| D5 | OB002 | $(X,Y,Z)_{D5}$ | I | $(U_{D5}, V_{D5})$ | $E_{D5}$ |

RAY_ID identifies the sample ray in the data structure; PROB_OBJ identifies which object is intersected by the identified ray; PROP_PNT identifies the intersection point in world coordinates of the identified ray and the intersected object; PROP_TYPE identifies the propagation type of the identified ray as either type I or type II; DIRECTION identifies the direction of the identified ray in polar coordinates (or UV coordinates on a unit hemisphere); and INTENSITY identifies the intensity of the sampled light associated with the identified ray. The data structure also includes header elements identifying the point N for which the structure applies, usually by its location in world coordinates, and elements identifying the surface and the object containing point N and the local orientation of the surface at point N. Using this data structure and referencing the surface parameters of the object identified by the data structure, the reflected light from point N in any direction can be calculated.

"diffuse sum" indicating the sum irradiance at the point. In some embodiments, only the type I rays are stored in an NDE data structure, in which case, the propagator type field is not needed in the NDE structure.

Figure 1:
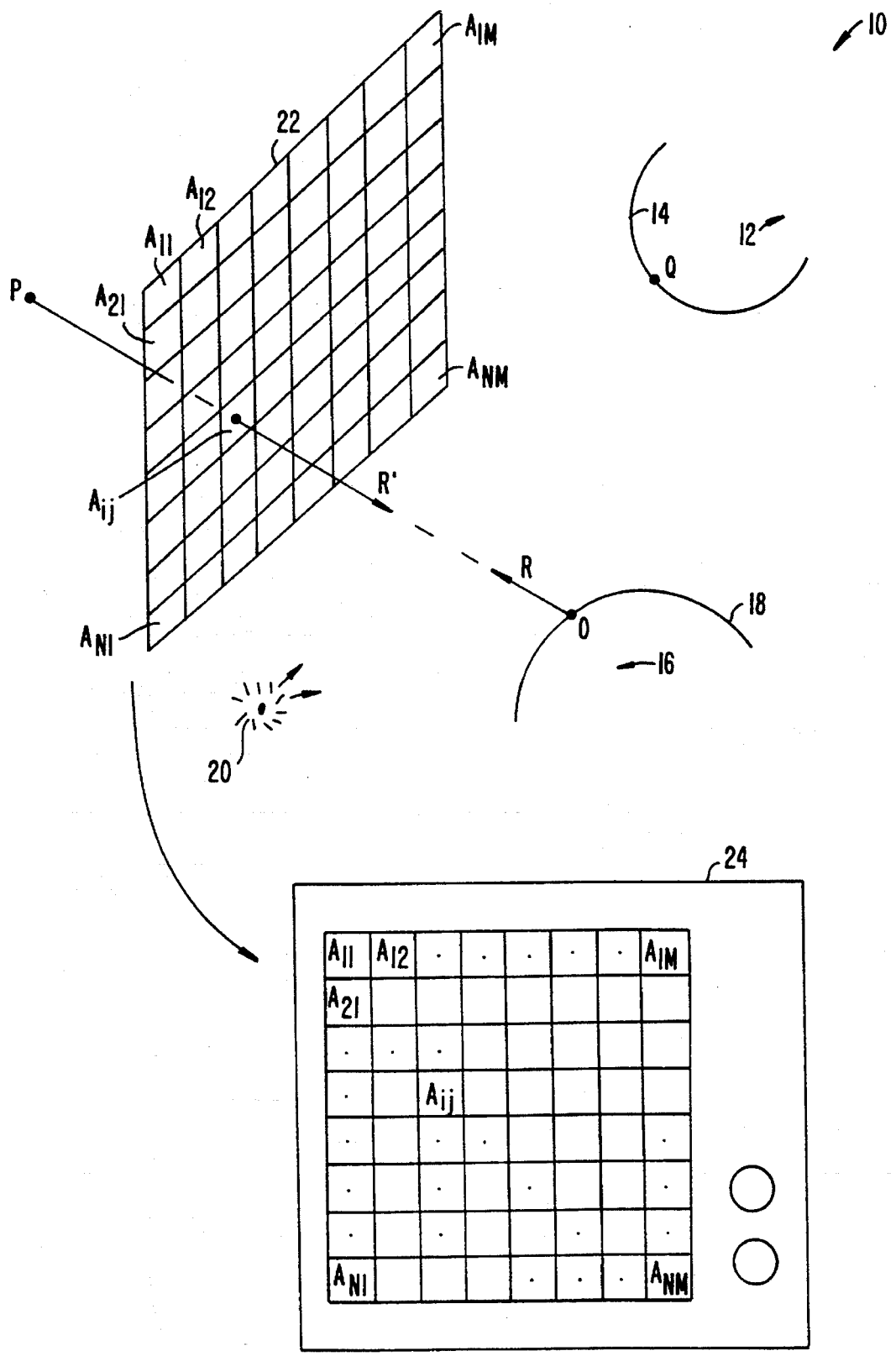
FIG. 1 is an illustration of a model space containing light sources and objects to be imaged on a pixelated display.

FIGS. 6(*a*)–(*b*) form a flowchart illustrating one method of operation of rendering program 106 (shown in FIG. 4) when executed by CPU 102. The operation of rendering program 106 is described below with reference to model space 10, shown in FIG. 1, although other model spaces work equally well. CPU 102 begins the program in block 200, and proceeds to block 202. In block 202, CPU 102 reads model database 108 which describes the model space, and the CPU initializes its internal tables with the necessary limits and program variables, then proceeds to block 204.

In block 204, the program initializes NDE database 110, however, for some conditions, such as where a new view is to be generated from a model for which a view has already been generated, the prior contents of NDE database 110 are used and NDE database 110 is not cleared. The program then proceeds to block 206.

In block 206, the program selects an uncolored pixel to color. CPU 102 maintains a program variable indicating which pixel, if any, was last colored. If the pixels are colored in a determined order, such as top row to bottom row and from left to right within a row, then the next pixel to be colored is determined from the last pixel variable. Once the pixel ($A_{ij}$ for example) is selected, the program proceeds to block 208 to evaluate a color viewed through unit area $A_{ij}$. Alternatively, in block 206, an inner loop is performed once for each of a plurality of tracing rays through one pixel, and the results of multiple samplings are combined to form a single color, by averaging or other combination method. With the proper set of multiple tracing rays through a single pixel, "staircase" edges and other aliasing effects can be reduced in the image formed by the pixels.

In block 208, the program traces ray R' from view point P through the center of unit area $A_{ij}$ until intersecting an object at a shading point, in this case, object 16 at point 0. Once the shading point O is located in model space 10, the program proceeds to block 210. Shading point O is relevant to the rendering process because the light reflected off shading point O in the direction of ray R determines the color of pixel $A_{ij}$.

Figure 2:
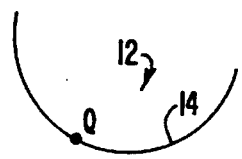
FIG. 2 is an illustration of a surface of an object in the model space.
Figure 2:
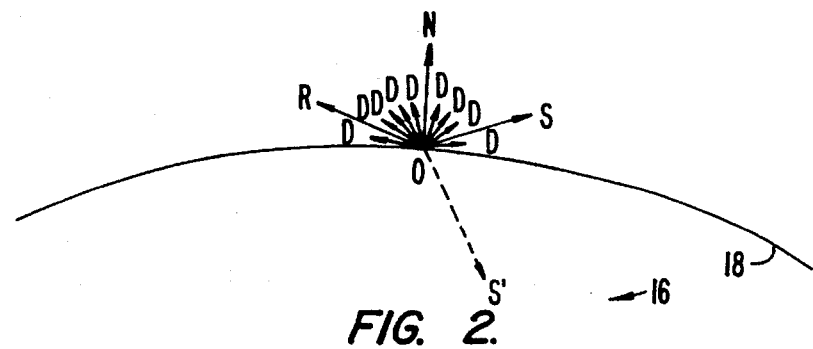

In block 210, the program determines the light incident on the shading point. FIG. 6(b) shows more detail as to how this step is done. Once the light incident on the shading point is determined, the program proceeds to block 212. In either block 208 or block 210, if the orientation of surface 18 at point O is not known, it is extracted from the information in model database 108. The orientation can be described either by local tangents to the surface, or a normal vector, such as vector N in FIG. 2.

In block 212, the program uses the illumination calculated in block 210 to determine how shading point O is illuminated. Model database 108 includes, for each object, surface properties of the object. An example of a surface property is a surface which specularly reflects 90% of the light energy incident on the surface, diffusely reflects 10% of all red wavelengths, and absorbs the rest. This surface might describe the surface of a fairly shiny red object. The surface properties need not be constant over the surface of the object; a multi-colored object with varied degrees of shine could be placed in the model space. From the surface property at the shading point, the point's surface orientation, and the illumination which was determined in block 210, the light reflected in the direction of ray R is calculated, in block 212. Because the illumination information includes directional information, the specular reflection off the shading point can be calculated as well as the diffuse reflections.

In block 214, pixel $A_{ij}$ is assigned a color of the light reflected along ray R. Color of light describes the shade and the intensity of the light. Thus, the color assigned to pixel $A_{ij}$ visually indicates what light arrives at unit area $A_{ij}$ in the direction of ray R. Any necessary conversions to a color space of the means for display can be done at this time.

In block 216, the program checks to see if all N×M pixels have been colored. If not, the program proceeds again to block 206 to select a next pixel. If all pixels have been colored, then those pixels form the desired image of model space 10, and the rendering program ends. At this point, CPU 102 might output the image to an output device over image output bus 112. Pixels may be colored in any order, but if nearby pixels are colored near in time to each other, memory paging might enhance the speed of computation. For example, if RAM 104 can hold the NDE's and pixel color values for a block of 8×8 pixels which are processed sequentially, portions of NDE database 110 can be paged into RAM 104 and accessed repeatedly, thereby reducing the total number of access of NDE database 110 for a given rendering.

Figure 6A:
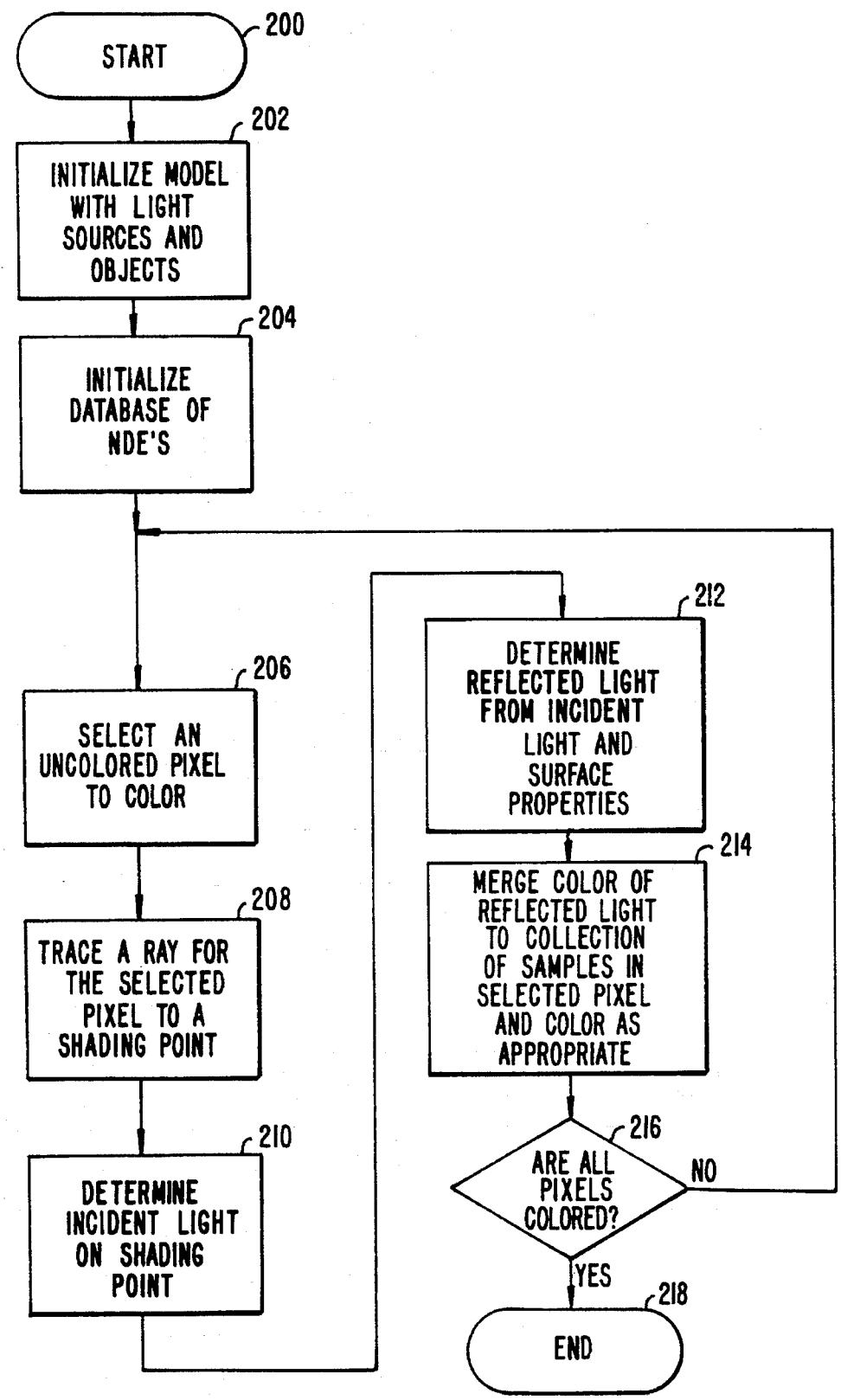
FIG. 6(a) is a flowchart of a rendering operation.
Figure 6B:
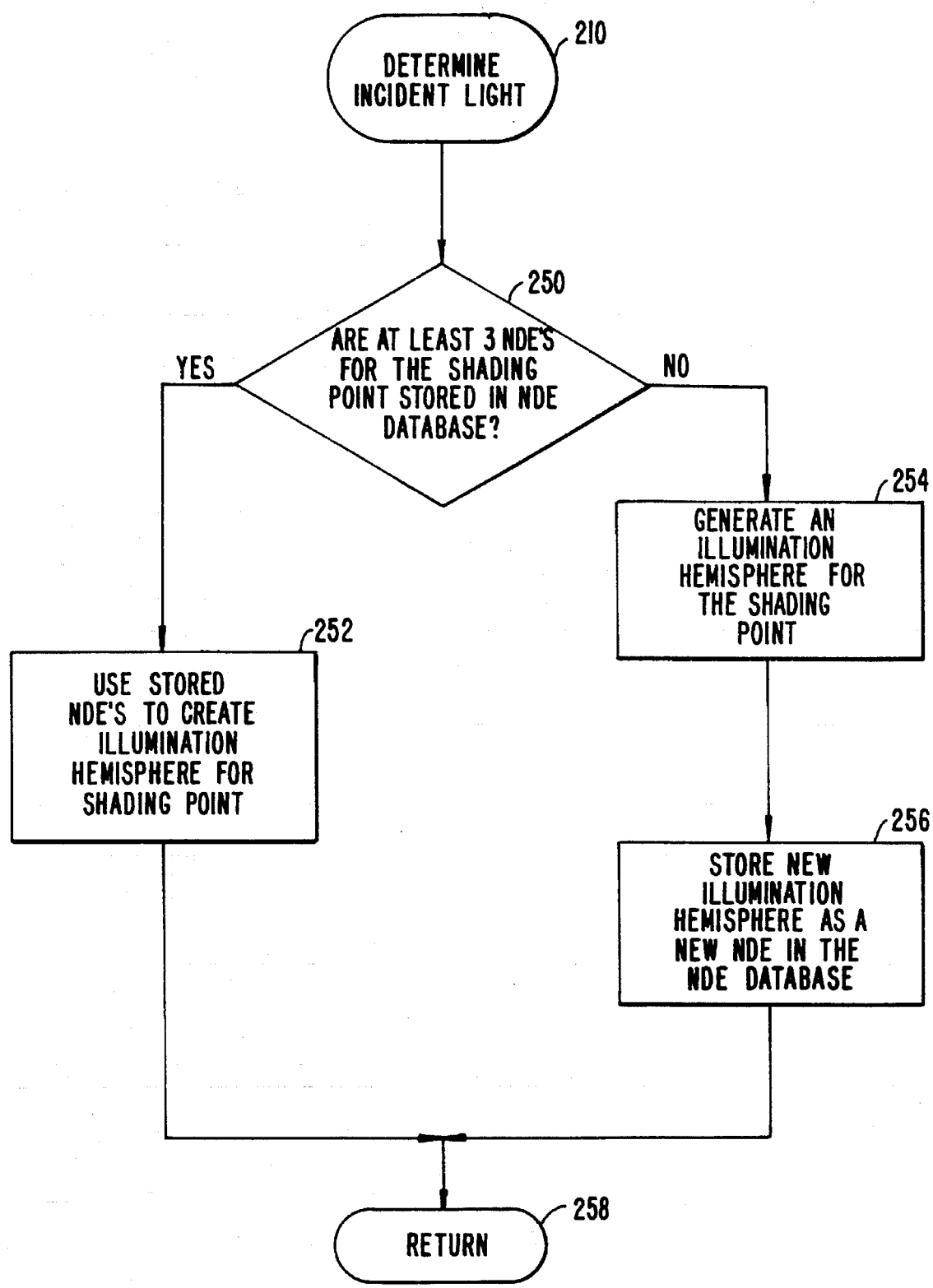
FIG. 6(b) is a more detailed flowchart of the incident light determining step in FIG. 6(a)

FIG. 6(b) illustrates the operation of block 210 of FIG. 6(a) in more detail. To begin, the program proceeds to block 250. In block 250, the program checks whether at least three suitable NDE's are available in NDE database 110. If they are, the program proceeds to block 252 and then returns at block 258, otherwise the program proceeds to block 254, then to block 256, and the returns at block 258.

In block 250, the program determines the existence of suitable NDE's by searching NDE database 110 heuristically and testing the NDE's therein against suitability parameters. Each NDE contains a field which indicates the location of a center point for that NDE (which was the shading point for the illumination hemisphere from which the NDE is derived), as well as a field indicating the orientation of the surface of an object through the center point, a field identifying the object the point is on, and a field indicating a diffuse sum (the sum irradiance at the center point from all directions). The suitability of an NDE for estimating light at a nearby shading point is guided by three quantities: 1) the distance between the NDE and the shading point, 2) the curvature of the surface between the NDE and the shading point, and 3) the difference between the diffuse sums of various suitable NDE's. The lower each of these quantities are, the more suitable the NDE.

In the ideal limiting case, all of these quantities are zero, and the only suitable NDE's are those exactly at the shading point, which makes the ideal limiting case equivalent to evaluating NDE's for every point. Thus, maximum allowed values for the three quantities will depend on the image accuracy desired and the allowable computational cost for rendering the image. The allowable maximums might not be independent maximums, but instead some allowed maximums might rise if other allowed maximums are reigned in. Furthermore, the actual maximum values might be user-settable when an image is rendered.

If three suitable NDE's are found, the NDE's are used to generate the illumination hemisphere for the shading point in block 252. In alternate embodiments, the number of suitable NDE's required by the query of block 250 might be one, two, or more than three. Requiring a higher number of NDE's might provide more accurate results, but at a cost of generating NDE's for more points.

Figure 7:
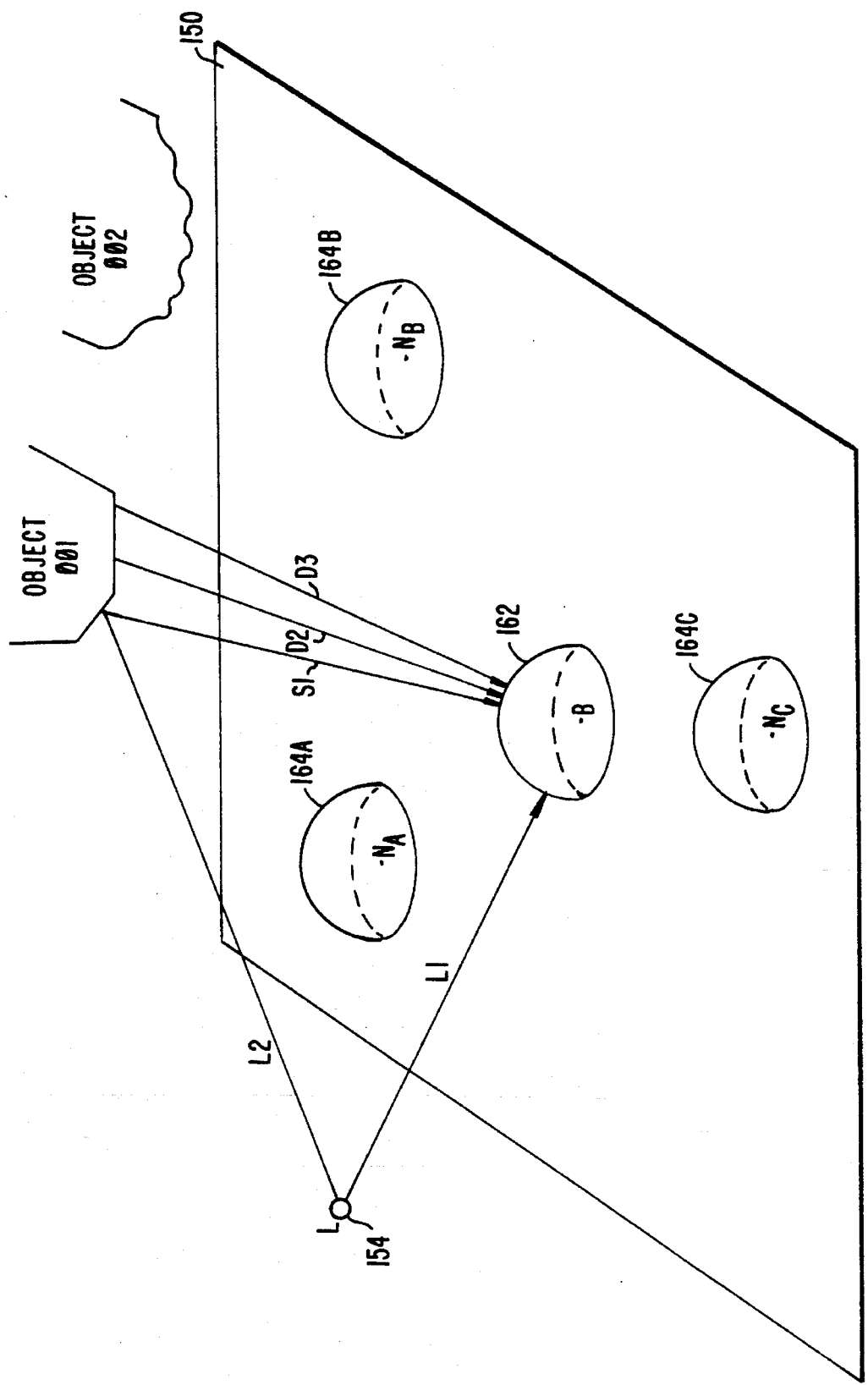
FIG. 7 is an illustration of a point on a surface in a model space which has nearby diffuse estimators.

In block 252, an illumination hemisphere is generated for the selected shading point using the suitable NDE's found in block 250. FIG. 7 illustrates this process. FIG. 7 shows a surface 150 with an illumination hemisphere 162 centered on a shading point B, and NDE's 164a–c centered on three center points $N_{a-c}$, along with light source 154 and objects O01 and O02 which illuminate point B. In FIG.7, only type II illumination rays (L1, S1, D2, D3) are shown.

The type I rays for point B are determined from the type I rays stored in the NDE's. Typically, this is done by averaging the diffuse illumination of the three NDE's and setting the diffuse illumination of point B to that average. The type II rays are determined either by scanning for type II sources or by interpolating between saved type II rays in the NDE's. Alternatively, the type II rays are determined by scanning only parts of the illumination hemisphere for samples, where the parts to scan are indicated by the direction of saved type II rays in the NDE's. Optionally, the newly created illumination hemisphere is saved as a new NDE, as described above.

If suitable NDE's are not found in block 250, the program proceeds to block 254, where an illumination hemisphere is generated as described above in connection with FIG. 5. When an illumination hemisphere is generated without reference to NDE's, it is saved as an NDE, since points nearby a point lacking suitable NDE's will likely also be lacking suitable NDE's. Finally, the program proceeds from either block 252 or block 256 to block 258 and the program returns to the flow shown in FIG. 6(*a*). The process shown in FIG. 6(*b*) might be recursive, as illumination of intersection points on propagators needs to be calculated to find the illumination of shading points. The recursion begins the same process as described in connection with FIG. 6(*b*), performed for the intersection point on the propagator. Typically, the recursion has a limit to prevent an infinite recursion. This limit could be either a limit on the number of recursion layers allowed (i.e., illumination after three diffuse reflections is not considered) or a limit on the lowest light level (i.e., a string of multiple reflections is truncated so that the total attenuation along the reflection path is less than a set limit).

In FIG. 6(*b*), incident light on a shading point (which is on a "shading object") is determined by sending out sampling rays from the shading point, with each sampling ray going out in a direction from the shading point until it intersects an object which gives off light, either an original light source or an object which reflects light incident on it. If a model does not have a bounding object or surface, such as the "walls" of a room being modelled, a bounding surface can be added without affecting the model, even if it is necessary to make the bounding surface a completely black, nonreflective surface. With a bounding surface, every sample ray is assured of hitting something and is assured that when the bounding surface is hit, nothing else would have been hit (i.e., the bounding surface does not obscure any other objects in the model space). For the following discussion on methods of determining incident light from the direction of a ray, it is generally irrelevant whether the object is the originator of the light or whether it is a non-self-luminous object, so the discussion will refer to everything as objects without loss of generality.

If the shading object is opaque, then the sampling rays pass through the illumination hemisphere which is centered over the shading point and oriented with its circular edge in the plane tangential to the shading point on the surface of the shading object. For translucent objects, sampling rays pass through an illumination sphere. The sampling rays are sent out until they hit an object, and then the rays "return" a sample color of the light given off by the object. With adaptive sampling, one or more initial rays are sent out and their returned samples are examined to decide where, if at all, to send additional rays. For example, where some of the rays return samples which indicate a high spatial frequency (rapid color variations over a solid angle, such as edges, shadows, or complex patterns on object surfaces), additional rays may be sent out in the direction of the high frequencies. Once the adaptive sampling process reaches a point where no more rays are sent out, a light accumulation process accumulates the color samples returned by the rays into an illumination data structure. This accumulation step might just be a gathering step where all the rays sent out are stored, or an actual accumulation step where the returned rays are "summarized" by a smaller number of rays.

The color returned by a ray is a measure of the light from the sampling ray's direction. However, the light from a single point in the illumination sphere is infinitesimal unless the ray happens to exactly intersect a point light source. More accurately, the sample ray should return the light from a finite solid angle around the ray, where the light in that finite solid angle is the light from the surfaces of objects visible from the shading point through that finite solid angle. Which solid angles go with which sample rays is not known completely until it is determined which rays are sent in which directions, since the solid angle associated with a ray is generally those angles closer to that ray than any other ray. Of course, the term "closer" might refer to a quantity or metric which is not just angular distance, as explained below.

Since the size of the finite solid angles around the rays it not fixed until the adaptive sampling process is done sending out rays, the prior art sampling processes have generally avoided using finite solid angles due to this problem. In one prior art method, sample rays are sent out and return a color value of the object intersected by the ray, where the returned color value is the light intensity of the entire object. If more sample rays are sent out, they too return the intensity of the entire object. When sampling is complete, an accumulation process compares nearby rays to determine if more than one ray hit a particular object. If only one ray hits the object, then the contribution to the total illumination for that ray is the light of the entire object, on the theory that all the light from the object illuminates the shading point through the solid angle subtended by the object. This process ignores any obscured portions of the intersected object, resulting in the light incident on the shading point being over-estimated. The problem is that the information returned for the sample rays is only "visibility" data and doesn't include "invisibility" data.

When the accumulation process detects multiple rays hitting an object, the samples from those rays are not added, since each sample represents the entirety of the light from that object. Instead, the accumulation routine might perform a step of eliminating all but one of the rays intersecting each object, or a step of dividing the total illumination of the object all the rays intersecting the object. However, since the sampling process only returns a color value, the accumulation routine must guess which rays hit which object by looking at the returned color. If the objects in the model all have different total light intensities, then the detection of which object goes with which ray might work acceptably. However in the general case, a better method is needed.

Figure 8:
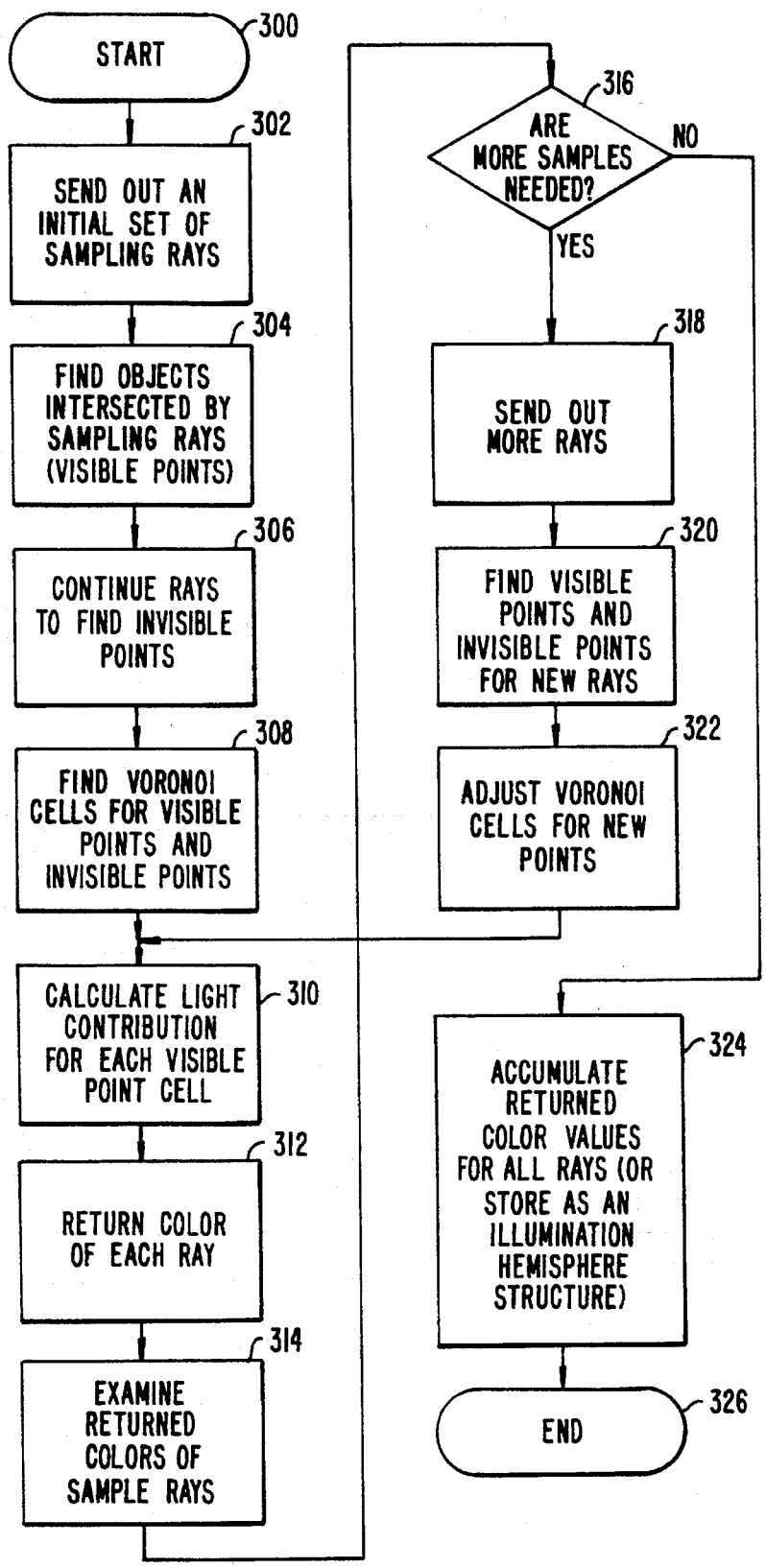
FIG. 8 is a flowchart of a ray sampling and accumulate process for estimating the light incident on a shading point.

FIG. 8 is a flowchart of a sampling and accumulation process according to the present invention which illustrates the above concept and the improvement provided by the present invention. In the embodiment shown in the drawings, the sampling and accumulation process is performed by rendering program 106, which by the way, may use parallel processing to complete the sampling process in a shorter time. Program 106 begins the process at block 300 for a given shading point, and proceeds to block 302. The program flow from block 302 is to operation blocks 304, 306, 308, 310, 312, 314, then to decision block 316. With a "yes" decision, the program proceeds to operation blocks 318, 320, 322, and then back to operation block 310. With a "no" decision, the program proceeds to operation block 324, and then ends the sampling and accumulation process at block 326.

In block 302, the program sends out an initial set of rays from the shading point to sample the objects visible from the shading point. These initial rays might be rays directed at known objects or previously calculated directions.

In block 304, the program intersects objects with the sampling rays to identify visible points. A visible point is a points of intersection of the sampling ray and a surface which is visible from the shading point. Because each ray begins at the shading point, the first point intersected by the ray is visible from the shading point. Other intersection points may also be visible, as explained below, if the first intersection point is not on an opaque surface. Because of the presence of the bounding object, a ray is guaranteed to intersect an object somewhere.

In block 306, the program extends the sample rays to intersect any surfaces beyond the visible point first intersected. These later intersection points are called invisible points, because they are obscured from the view of the shading point by whatever object was first intersected. In some embodiments, some intersection points are partially visible points, which are points on a sampling ray beyond a visible point where the visible point is on a translucent surface. A partially visible point is treated as a visible point with a light contribution adjusted according to the point's partial visibility. Because of the placement of the bounding object, the rays need not be extended once the extension of the ray intersects the bounding object.

Figure 9:
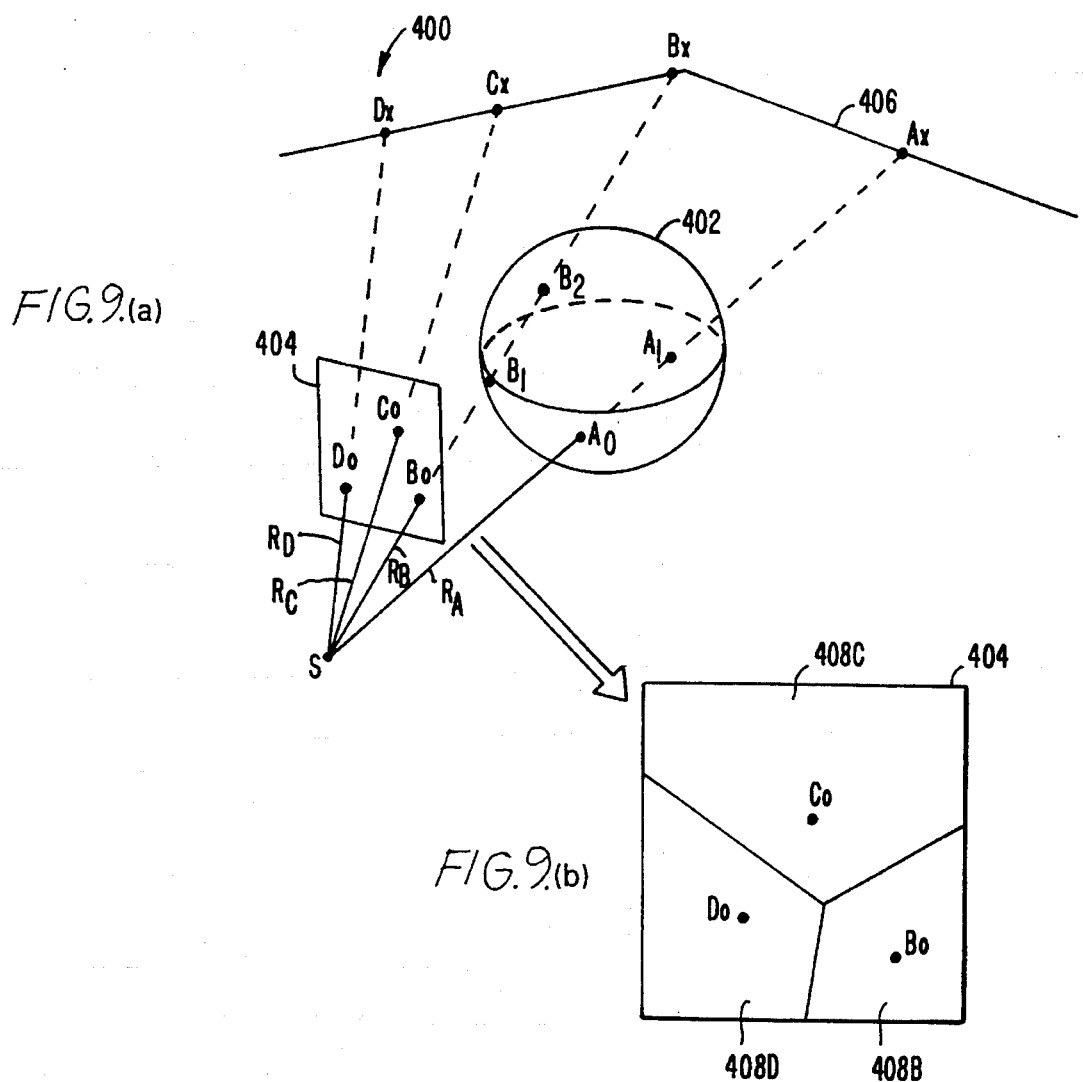
FIG. 9 shows a model space which illustrates the ray sampling and accumulate operation.

In block 308, the surfaces intersected by at least one visible point are divided into Voronoi domains, or cells, based on all intersected points, visible or invisible. If a surfaces has no visible intersection points, it need not be divided, since no light from the object reaches the shading point, at least in the estimation of the sampling rays. Each cell is a finite area of a surface associated with an intersection point, and the area of the cell comprises all the points on the surface for which the cell's associated intersection point is the closest intersection point. The term closest refers to the minimization of a metric, which in this example is distance on the surface. This is illustrated in FIG. 9 and discussed in more detail below. Other metrics besides the separation distance of two points on the surface of the object are also possible, such as separation distance of the projection of the two points onto the illumination hemisphere, or the separation between the two points in world coordinates.

Once the cells associated with intersection points are found, in block 310, the light contribution from each cell is calculated. Depending on the desired accuracy, the light contribution is calculated by one of a number of ways. The light from each cell might be assumed to be constant, or the light from the cell could be found by integrating a two-dimensional illuminance function over the cell's area.

In block 312, the color of the cell's light is returned for each ray. Although it might not be needed for the immediate process, the intersection point is also returned, at least for the visible intersection points. In some embodiments, information related to the boundaries of the cell is also returned.

In block 314, the returned colors are examined to see if any solid angles of the illumination sphere need additional samplings, as would sometimes be required in areas of high spatial frequency color variations.

In block 316, if more samples are needed, the program proceeds to block 318, otherwise it skips to block 324.

In block 318, more sample rays are sent out.

In block 320, visible points and invisible points for the additional sample rays are found.

In block 322, the Voronoi cells are adjusted to account for the additional intersection points. Because invisible points are taken into account when generating the Voronoi diagram, obscured portions of surfaces will be approximately covered by cells of invisible points, while visible portions of surfaces will be approximately covered by cells of visible points, with sufficient samples. Thus, this technique provides, as a byproduct, indications of hidden surfaces, which is useful in other processes beyond light estimation. After the cells are adjusted for the additional points, the program loops back to block 310.

Eventually, the program will be satisfied with the number of samples, and will proceed to block 324, where the color values for each sample ray are accumulated and/or stored. Using this method, the color values for each sample ray are not the light from the entire object intersected by the sample ray, but just the contribution from a solid angle around the sample ray direction. Therefore, the total illumination of the shading point is the straight sum of all the samples.

The program returns at block 326. At this point, with the illumination of the shading point determined, some of the information collected in the sampling and accumulation routine is saved as an NDE.

FIG. 9 is an illustration of the above process applied to a model space 400. Model space 400 is shown with a shading point S, a sphere 402 and a surface 404 in the view of shading point S with sphere 402 partially obscured by surface 404, and bounding surface 406 visible from all directions from shading point S except for the solid angles subtended by sphere 402 and surface 404. Also shown are rays $R_{A-D}$. Ray $R_A$ intersects sphere 402 at one visible intersection point ($A_0$) and one invisible intersection point ($A_1$), and also intersects bounding surface 406 at $A_x$. Similarly, rays $R_{B-D}$ intersect surface 404 at visible intersection points ($B_0$, $C_0$, $D_0$), bounding surface 406 at invisible intersection points ($B_x$, $C_x$, $D_x$), and ray $R_B$ also intersects sphere 402 at two invisible intersection points ($B_1$, $B_2$). This example assumes that neither sphere 402 or surface 404 is translucent. FIG. 9 also shows a 2-D Voronoi diagram for surface 404, with cells 408B-D identified.

Suppose all four rays $R_{A-D}$ are sent out as the initial set of sample rays (extension to adaptive sampling is straightforward). Each ray is extended in its assigned direction from point S up to bounding surface 406, and all the intersections with objects along the ray are noted, whether visible or not. Bounding surface 406 need not explicitly exist, as it is only used to stop the extension of the ray, and any other means of limiting the search for intersection points on a ray can be used in place of bounding surface 406. If a bounding surface is used, it should be placed "behind" the visible objects. While one bounding surface is usually possible for all shading points, different bounding surfaces for different points are possible.

Once all the intersection points, visible or invisible are found, the surface of sphere 402 and surface 404 are divided into cells according to a Voronoi diagram. Note that since bounding surface 406 happens not to contain any visible intersection points in this example, it does not need to be divided into cells. Sphere 402 is divided into four cells, each associated with one of the points $A_0$, $A_1$, $B_1$, or $B_2$. Of these four cells, a light value is only returned for the $A_0$ cell, since the other three points are invisible. Light is not returned for the other three points, but they are used find the right boundaries for the visible cells. Once the visible cells are identified, it is a simple matter to find the light contribution from those cells.

As the front view of surface 404 in FIG. 9 shows, the Voronoi diagram for the three points ($B_0$, $C_0$, $D_0$) is formed by three line segments through midpoints of line segments between the points, all coming together at a point equidistant from all three points.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for coloring pixels of a pixelated display to present a simulated image of a view of objects illuminated by light from light sources and light reflected off the objects, the method comprising the steps of:

defining a space;

positioning objects and light sources in said space;

positioning a view point in said space;

positioning a view surface in said space;

dividing said view surface into a plurality of unit areas;

associating each unit area of said plurality of unit areas with a pixel of the pixelated display;

initializing a calculation storage area which includes storage for each of a plurality of calculation results, a calculation result including at least an indication of an incident light ray color, an incident light ray direction, and a reflection type selected from a specular reflection type and a diffuse reflection type;

calculating, for each unit area, a color value, said step of calculating a color value comprising the steps of:

tracing at least one ray from said view point through said unit area to intersect a shading point to be shaded on a surface of an object in the space, or to intersect a point on a background surface if no object is intersected by said traced ray;

identifying light rays incident on said shading point, wherein said light rays are identified either by determining which objects and light sources cast light rays onto said shading point, or by determining which objects and light sources provide a specular reflection of light which is incident on said shading point and retrieving a saved indication of diffuse reflections incident on said shading point;

saving an indication of said identified light rays in said calculation storage area, saving at least an indication of an incident light color and direction, and saving an indication of a reflection type for each identified light ray if more than one reflection type is saved, said saving step performed when a new indication is calculated;

calculating a reflected light which would reflect off said intersected surface at said shading point in a direction of an origin of said traced ray when illuminated by said identified light rays, including at least one calculation which is a function of incident light direction at least when the reflection type is a specular reflection type; and assigning a color of said reflected light in said direction of said traced ray to the pixel associated with said unit area, or a combination of colors of reflected light in the direction of multiple rays if multiple rays are used.

2. The method of claim 1, wherein a color of a light is an intensity and a color.

3. The method of claim 1, wherein a color of a light is described by at least three spectral components.

4. The method of claim 1, wherein said steps are performed by an appropriately programmed digital computer.

5. The method of claim 1, wherein the pixelated display is a computer monitor.

6. The method of claim 1, wherein the pixelated display is a printer.

7. The method of claim 1, wherein said step of identifying incident rays includes the step of identifying a unique initial source for said incident rays so quantities of light energy from a light source are not accumulated more than once in determining the incident light on said shading point.

8. The method of claim 1, wherein said step of calculating a color value further comprises the steps of:

sending multiple rays from said viewpoint through different points in said unit area; and combining the color values from each of the multiple rays into a single color value for said unit area.

9. An apparatus for rendering an image which is a simulated view of objects illuminated by light from light sources and light reflected off the objects, the apparatus comprising:

a pixelated display, wherein a plurality of pixels are displayable, each pixel colorable by a constant shade over the extent of said pixel;

a model memory, for storing representations of the objects and the light sources positioned in a space with a view point and a view surface, where said view surface is divided into a plurality of unit areas, each unit area corresponding to a pixel of said pixelated display;

an illumination memory, comprising storage for a plurality of illumination sets, wherein an illumination set describes, for a given shading point on an object in said space, incident light rays according to their color, incident direction, and ray type, said ray type being one of a direct light ray, a specularly reflected light ray, or a diffusely reflected light ray;

a calculation unit, coupled to said model memory and said illumination memory, and including an output for said pixelated display, wherein said output includes a calculation of a color of light passing through each unit area to said view point, said calculation based on which point of which object in said model memory is visible in said unit area from said view point and based on an illumination set for either said point of said object, or nearby points on a surface of said object near said point, if illumination sets are stored in said illumination memory for said nearby points, said calculation also a function of at least a ray type and an incident direction of an incident light ray described by the illumination set used; and storage means, coupled to said calculation unit and said illumination memory, for storing illumination sets calculated when an illumination set is calculated for a point on an object.

10. The apparatus of claim 9, wherein an illumination set is a nearby diffuse estimator for its given shading point, in that the illumination set indicates the diffusely reflected light energy incident on the given shading point.

11. A method for estimating light incident on a shading point from objects in a space, where the location of the objects in the space is known and the light given off by the surfaces of the portion of the objects visible from the shading point is known, the method comprising the steps of:

tracing a plurality of sample rays from the shading point to intersect, if at all, a surface of an object in the space;

identifying visible points for each of said plurality of sample rays, where a visible point is an intersection point of each sample ray and a surface visible from the shading point;

continuing said each sample ray beyond the visible point for the sample ray to invisible intersection points, invisible intersection points being points on a surface which are not visible from the shading point;

at least for one surface containing at least one visible point and one invisible point, dividing the one surface into cells, where a cell is associated with each intersection point on a divided surface and boundaries of the cell are determined such that a metric between a point in the cell and said intersection point of the cell is lower than said metric between said point in said cell and any other intersection point on said surface;

returning to the shading point, for each sample ray, a color of light incident on the shading point from a surface area defined by a cell associated with the sample ray; and accumulating said returned color values into a total illumination value indicating the light incident on the shading point.

12. The method of claim 11, wherein said metric is either the distance on said surface between two points or the distance in space between the two points.

* * * * *